US012665406B2

(12) United States Patent
Godinez et al.

(10) Patent No.: US 12,665,406 B2
(45) Date of Patent: Jun. 23, 2026

(54) TEMPERATURE SENSING TAPE HAVING A TEMPERATURE SENSOR ELEMENT WITH MULTIPLE CRYSTALLIZATION POINTS

(71) Applicant: Littelfuse, Inc., Chicago, IL (US)

(72) Inventors: Sergio Fuentes Godinez, Chicago, IL (US); Marco Doms, Chicago, IL (US); Oluwaseun K. Oyewole, Chicago, IL (US); Aalok Bhatt, Chicago, IL (US); Francois Perraud, Chicago, IL (US); Martin Pineda, Chicago, IL (US)

(73) Assignee: Littelfuse, Inc., Rosemont, IL (US)

( * ) Notice: Subject to any disclaimer, the term of this patent is extended or adjusted under 35 U.S.C. 154(b) by 173 days.

(21) Appl. No.: 18/504,964

(22) Filed: Nov. 8, 2023

(65) Prior Publication Data

US 2024/0154402 A1 May 9, 2024

Related U.S. Application Data

(60) Provisional application No. 63/423,860, filed on Nov. 9, 2022.

(51) Int. Cl.
| | |
|---|---|
| *H02H 1/00* | (2006.01) |
| *G01K 1/024* | (2021.01) |
| *G01K 3/00* | (2006.01) |
| *G01K 7/16* | (2006.01) |
| *H02H 6/00* | (2006.01) |

(52) U.S. Cl.
CPC .......... *H02H 1/0007* (2013.01); *G01K 1/024* (2013.01); *G01K 3/005* (2013.01); *G01K 7/16* (2013.01); *H02H 6/00* (2013.01)

(58) Field of Classification Search
CPC ........ H02H 1/0007; H02H 6/00; G01K 1/024; G01K 3/005; G01K 7/16; G01K 11/06
See application file for complete search history.

(56) References Cited

U.S. PATENT DOCUMENTS

| | | | | |
|---|---|---|---|---|
| 5,325,721 A | * | 7/1994 | Pendergrass, Jr. ..... | G01K 11/06 374/E11.006 |
| 5,841,617 A | * | 11/1998 | Watkins, Jr. ........... | H02H 5/043 219/494 |
| 6,512,203 B2 | * | 1/2003 | Jones ....................... | H05B 3/84 219/219 |
| 6,538,415 B1 | * | 3/2003 | Fang ........................ | G01K 7/22 320/150 |
| 7,080,939 B1 | * | 7/2006 | Fair .......................... | G01K 3/04 374/161 |

(Continued)

OTHER PUBLICATIONS

International Search Report and Written Opinion for International Application No. PCT/US2023079147, mailed Mar. 5, 2024, 15 pages.

*Primary Examiner* — Thienvu V Tran
*Assistant Examiner* — Muaamar Qahtan Al-Taweel
(74) *Attorney, Agent, or Firm* — KDW Firm PLLC

(57) ABSTRACT

A temperature sensing tape is provided and can include an insulating support structure and at least one temperature sensing element disposed on the insulating support structure wherein the at least one temperature sensing element can be formed from a single polymer mixture that includes two or more polymers, and wherein each of the two or more polymers can have a respective, different crystallinity point.

20 Claims, 4 Drawing Sheets

(56) References Cited

U.S. PATENT DOCUMENTS

| | | | | |
|---|---|---|---|---|
| 9,029,180 | B2 * | 5/2015 | Britton | H01C 7/041 |
| | | | | 438/210 |
| 10,260,961 | B2 * | 4/2019 | Ferguson | G01K 7/16 |
| 10,352,726 | B2 * | 7/2019 | Giedd | G01N 27/125 |
| 11,209,320 | B2 * | 12/2021 | Hioki | H01C 7/04 |
| 2001/0011779 | A1 * | 8/2001 | Stover | B29C 48/71 |
| | | | | 264/1.7 |
| 2002/0145130 | A1 * | 10/2002 | Handa | H01C 17/06586 |
| | | | | 252/500 |
| 2005/0169671 | A1 * | 8/2005 | Kellie | G03G 15/101 |
| | | | | 399/237 |
| 2009/0050049 | A1 * | 2/2009 | Craig | G01K 1/02 |
| | | | | 374/E11.006 |
| 2014/0105242 | A1 * | 4/2014 | Fernandes | G01J 5/20 |
| | | | | 374/185 |
| 2015/0030898 | A1 * | 1/2015 | Butzmann | G01K 1/026 |
| | | | | 429/90 |
| 2015/0260584 | A1 * | 9/2015 | Wotzer | G01K 11/12 |
| | | | | 156/278 |
| 2016/0116346 | A1 * | 4/2016 | Aliane | B29C 35/00 |
| | | | | 374/185 |
| 2017/0049610 | A1 * | 2/2017 | Kang | A61F 7/0097 |
| 2020/0041359 | A1 | 2/2020 | Aida | |
| 2020/0217724 | A1 | 7/2020 | Golubovic | |
| 2021/0148767 | A1 | 5/2021 | Matus | |

* cited by examiner

100

104a          104b          104c 106c          106a          106b          106d

102

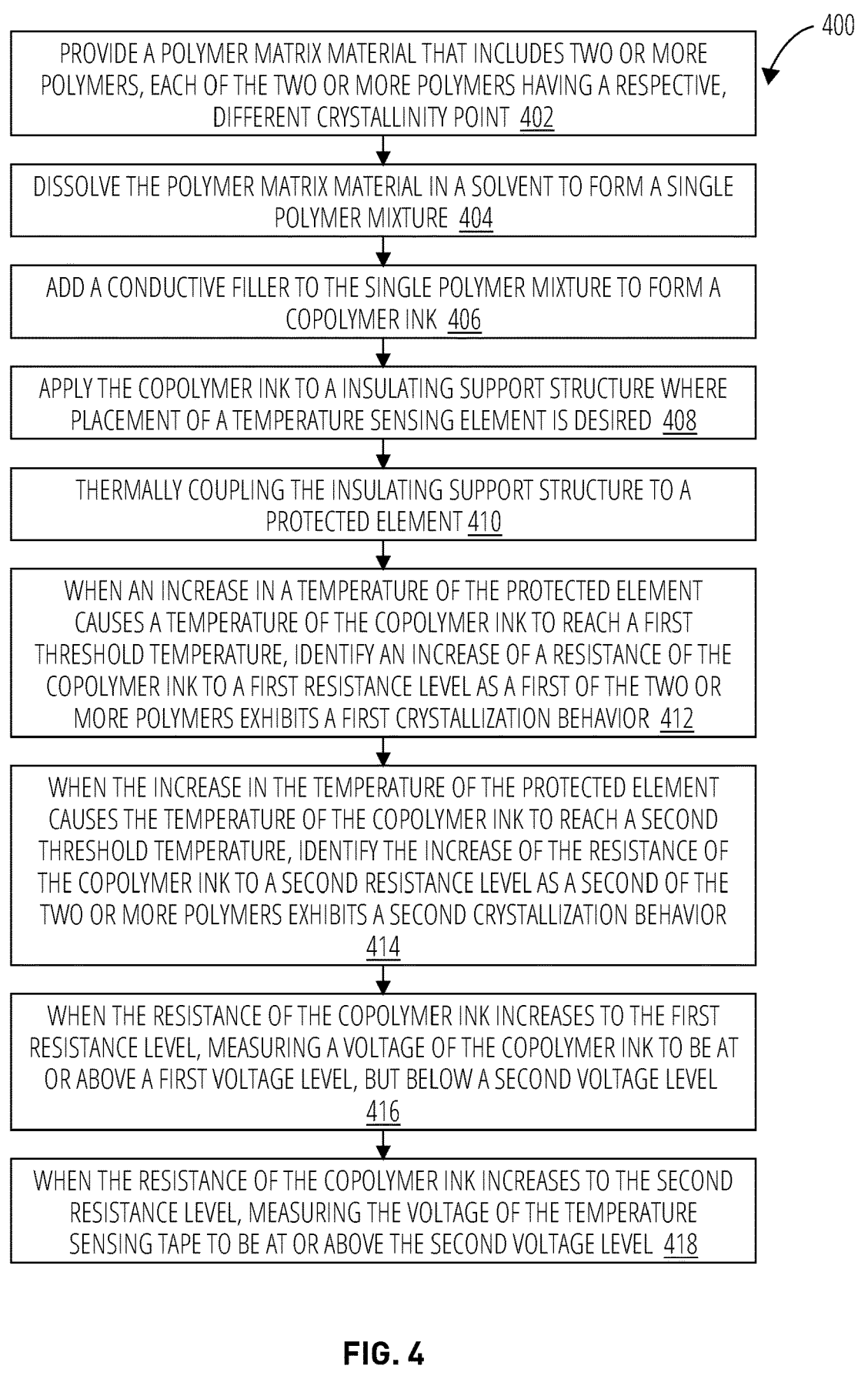

400

PROVIDE A POLYMER MATRIX MATERIAL THAT INCLUDES TWO OR MORE POLYMERS, EACH OF THE TWO OR MORE POLYMERS HAVING A RESPECTIVE, DIFFERENT CRYSTALLINITY POINT 402

↓

DISSOLVE THE POLYMER MATRIX MATERIAL IN A SOLVENT TO FORM A SINGLE POLYMER MIXTURE 404

↓

ADD A CONDUCTIVE FILLER TO THE SINGLE POLYMER MIXTURE TO FORM A COPOLYMER INK 406

↓

APPLY THE COPOLYMER INK TO A INSULATING SUPPORT STRUCTURE WHERE PLACEMENT OF A TEMPERATURE SENSING ELEMENT IS DESIRED 408

↓

THERMALLY COUPLING THE INSULATING SUPPORT STRUCTURE TO A PROTECTED ELEMENT 410

↓

WHEN AN INCREASE IN A TEMPERATURE OF THE PROTECTED ELEMENT CAUSES A TEMPERATURE OF THE COPOLYMER INK TO REACH A FIRST THRESHOLD TEMPERATURE, IDENTIFY AN INCREASE OF A RESISTANCE OF THE COPOLYMER INK TO A FIRST RESISTANCE LEVEL AS A FIRST OF THE TWO OR MORE POLYMERS EXHIBITS A FIRST CRYSTALLIZATION BEHAVIOR 412

↓

WHEN THE INCREASE IN THE TEMPERATURE OF THE PROTECTED ELEMENT CAUSES THE TEMPERATURE OF THE COPOLYMER INK TO REACH A SECOND THRESHOLD TEMPERATURE, IDENTIFY THE INCREASE OF THE RESISTANCE OF THE COPOLYMER INK TO A SECOND RESISTANCE LEVEL AS A SECOND OF THE TWO OR MORE POLYMERS EXHIBITS A SECOND CRYSTALLIZATION BEHAVIOR 414

↓

WHEN THE RESISTANCE OF THE COPOLYMER INK INCREASES TO THE FIRST RESISTANCE LEVEL, MEASURING A VOLTAGE OF THE COPOLYMER INK TO BE AT OR ABOVE A FIRST VOLTAGE LEVEL, BUT BELOW A SECOND VOLTAGE LEVEL 416

↓

WHEN THE RESISTANCE OF THE COPOLYMER INK INCREASES TO THE SECOND RESISTANCE LEVEL, MEASURING THE VOLTAGE OF THE TEMPERATURE SENSING TAPE TO BE AT OR ABOVE THE SECOND VOLTAGE LEVEL 418

FIG. 4

TEMPERATURE SENSING TAPE HAVING A TEMPERATURE SENSOR ELEMENT WITH MULTIPLE CRYSTALLIZATION POINTS

CROSS-REFERENCE TO CORRESPONDING APPLICATIONS

The present application claims the benefit of priority under 35 U.S.C. § 119 to U.S. Provisional Application Ser. No. 63/423,860, titled "TEMPERATURE SENSING TAPE HAVING A TEMPERATURE SENSOR ELEMENT WITH MULTIPLE CRYSTALLIZATION POINTS" and filed Nov. 9, 2022, the disclosure of which is incorporated herein by reference in its entirety.

FIELD

The present disclosure generally relates to temperature sensing devices. More particularly, the present disclosure relates to a temperature sensing tape having a temperature sensor element with multiple crystallization points.

BACKGROUND

Electrical systems and devices, such as batteries and semiconductors, for example, can be damaged by high temperature conditions if such conditions are allowed to persist. Therefore, it is common for electrical systems and devices to be equipped with temperature sensing devices that can be used to measure temperature variations at discrete locations in or on the electrical systems or devices. For example, if a measured temperature exceeds a predetermined threshold, an associated electrical system or device being protected may automatically shut off until such a condition subsides or is remedied, thereby preventing or mitigating any damage to the associated electrical system or device.

Known systems and methods for temperature sensing in a semiconductor or a semiconductor chip can utilize an in-built negative temperature coefficient (NTC) sensor, which can be mounted on a direct copper bonded substrate. In these systems and methods, most heat generated in the semiconductor or the semiconductor chip flows directly to a heat sink where it is dissipated ambiently. Unfortunately, the NTC sensor has a sluggish response on the order of ms due to systemic thermal inertia. As such, the NTC sensor is only suitable to represent a temperature of the semiconductor or the semiconductor chip in static points of operation. However, in dynamic situations, such as a short circuit, a control system must detect and shut down gate signals within a few μs to avoid destruction of the semiconductor or the semiconductor chip.

Known systems and methods for short circuit protection include desaturation detection, which can be implemented with a gate driver and is an indirect way to identify the short circuit by sensing voltage across the semiconductor or the semiconductor switch, which can be processed by a comparator and logic circuit in order to give signals to the gate driver. Unfortunately, such systems and methods involve significant analog circuit delay and may not be reliable to safely and timely shut down the semiconductor or the semiconductor chip every time.

To avoid such problems, other temperature sensors, such as polymeric positive temperature coefficient (PPTC) sensors and printed temperature indicator (PTI) sensors, have been developed to trip at a threshold temperature. In operation, a PPTC sensor or a PTI sensor will trip at a threshold temperature characteristic of a PPTC material or a PTI material used to form the PPTC sensor or the PTI sensor. For example, because a battery is designed to operate below a maximum operating temperature, a protection sensor protecting the battery can optimally operate to prevent operation of the battery above a maximum operating temperature by tripping when the maximum operating temperature is detected.

However, PPTC materials and PTI materials known in the art have a turn-on point at one specific temperature. As such, to create multiple temperature events, multiple PPTC materials or multiple PTI materials must be used.

It is with respect to these and other considerations that the present disclosure may be useful.

BRIEF SUMMARY

This Brief Summary is provided to introduce a selection of concepts in a simplified form that are further described below in the Detailed Description. This Brief Summary is not intended to identify key features or essential features of claimed subject matter or intended as an aid in determining scope of the claimed subject matter.

In some embodiments, a temperature sensing tape in accordance with the present disclosure can include an insulating support structure and at least one temperature sensing element disposed on the insulating support structure, wherein the at least one temperature sensing element can be formed from a single polymer mixture that can include two or more polymers, and wherein each of the two or more polymers can have a respective, different crystallinity point.

In some embodiments, when a temperature of the at least one temperature sensing element reaches a first threshold temperature, a resistance of the at least one temperature sensing element can increase to a first resistance level as a first of the two or more polymers exhibits a first crystallization behavior. Similarly, when the temperature of the at least one temperature sensing element reaches a second threshold temperature, the resistance of the at least one temperature sensing element can increase to a second resistance level as a second of the two or more polymers exhibits a second crystallization behavior.

In some embodiments, the temperature sensing tape can include an adhesive material, wherein the at least one temperature sensing element can be disposed on a first side of the insulating support structure, and wherein the adhesive material can be disposed on a second side of the insulating support structure.

In some embodiments, the at least one temperature sensing element can include a polymeric positive temperature coefficient (PPTC) sensor or a printed temperature indicator (PTI) sensor.

In some embodiments, the temperature sensing tape can include at least one flexible conductor disposed on the insulating support structure and arranged in series with the at least one temperature sensing element to form a conductive circuit.

In some embodiments, a thermal protection system in accordance with the present disclosure can include a protected element and a temperature sensing tape thermally coupled to the protected element, wherein the temperature sensing tape can include an insulating support structure and at least one temperature sensing element disposed on the insulating support structure, wherein the at least one temperature sensing element can be formed from a single polymer mixture that can include two or more polymers, and wherein each of the two or more polymers can have a respective, different crystallinity point.

In some embodiments, when an increase in a temperature of the protected element causes a temperature of the at least one temperature sensing element to reach a first threshold temperature, a resistance of the at least one temperature sensing element can increase to a first resistance level as a first of the two or more polymers exhibits a first crystallization behavior. Similarly, when the increase in the temperature of the protected element causes the temperature of the at least one temperature sensing element to reach a second threshold temperature, the resistance of the at least one temperature sensing element can increase to a second resistance level as a second of the two or more polymers exhibits a second crystallization behavior.

In some embodiments, the thermal protection system can include a control element electrically connected to the temperature sensing tape.

In some embodiments, when the resistance of the at least one temperature sensing element increases to the first resistance level, the control element can measure a voltage of the temperature sensing tape to be at or above a first voltage level, but below a second voltage level. Similarly, when the resistance of the at least one temperature sensing element increases to the second resistance level, the control element can measure the voltage of the temperature sensing tape to be at or above the second voltage level.

In some embodiments, responsive to the control element measuring the voltage of the temperature sensing tape to be at or above the first voltage level, but below the second voltage level, the control element can cause a warning signal to be issued.

In some embodiments, responsive to the control element measuring the voltage of the temperature sensing tape to be at or above the second voltage level, the control element can cause an alarm signal to be issued.

In some embodiments, responsive to the control element measuring the voltage of the temperature sensing tape to be at or above the second voltage level, the control element can initiate a shut down sequence to stop current flow in the protected element.

In some embodiments, the thermal protection system can include a load and a disconnect switch, wherein the protected element can provide power to the load, wherein the control element can be operatively connected to the disconnect switch, and wherein the disconnect switch can be connected in series between the protected element and the load. Responsive to the control element measuring the voltage of the temperature sensing tape to be at or above the second voltage level, the control element can cause the disconnect switch to be opened.

In some embodiments, a method in accordance with the present disclosure can include providing a polymer matrix material that can include two or more polymers, each of the two or more polymers having a respective, different crystallinity point, dissolving the polymer matrix material in a solvent to form a single polymer mixture, adding a conductive filler to the single polymer mixture to form a copolymer ink, and applying the copolymer ink to an insulating support structure where placement of a temperature sensing element is desired.

In some embodiments, the method can include heating the copolymer ink to evaporate the solvent.

In some embodiments, the method can include exposing the copolymer ink to radiation to crosslink the copolymer ink.

In some embodiments, the method can include thermally coupling the insulating support structure to a protected element. When an increase in a temperature of the protected element causes a temperature of the copolymer ink to reach a first threshold temperature, the method can also include identifying an increase of a resistance of the copolymer ink to a first resistance level as a first of the two or more polymers exhibits a first crystallization behavior. Similarly, when the increase in the temperature of the protected element causes the temperature of the copolymer ink to reach a second threshold temperature, the method can include identifying the increase of the resistance of the copolymer ink to a second resistance level as a second of the two or more polymers exhibits a second crystallization behavior.

In some embodiments, when the resistance of the copolymer ink increases to the first resistance level, the method can include measuring a voltage of the copolymer ink to be at or above a first voltage level, but below a second voltage level. Similarly, when the resistance of the copolymer ink increases to the second resistance level, the method can include measuring the voltage of the temperature sensing tape to be at or above the second voltage level.

In some embodiments, responsive to measuring the voltage of the copolymer ink being at or above the first voltage level, but below the second voltage level, the method can include causing a warning signal to be issued.

In some embodiments, responsive to measuring the voltage of the copolymer ink being at or above the second voltage level, the method can include causing an alarm signal to be issued, causing a disconnect switch to be opened, or initiating a shut down sequence to stop current flow in the protected element.

Other technical features may be readily apparent to one skilled in the art from the following figures, descriptions, and claims.

BRIEF DESCRIPTION OF THE SEVERAL
VIEWS OF THE DRAWINGS

FIG. 4 is a flow diagram illustrating a method in accordance with disclosed embodiments.

DETAILED DESCRIPTION

Exemplary embodiments of a temperature sensing tape in accordance with the present disclosure will now be described more fully hereinafter with reference made to the accompanying drawings. The temperature sensing tape may, however, be embodied in many different forms and should not be construed as being limited to the embodiments set forth herein. Rather, these embodiments are provided so that this disclosure will convey certain exemplary aspects of a temperature sensing tape to those skilled in the art.

Embodiments disclosed herein include a temperature sensing tape, a thermal protection system, and methods therefor that can include at least one temperature sensing element with multiple crystallization points. For example, the temperature sensing element can be formed from a single polymer mixture that can include two or more polymers such that each of the two or more polymers can have a respective, different crystallinity point, thereby causing multiple temperature responses with the single polymer mixture. In some embodiments, the single polymer mixture of the temperature sensing element can be used to discern two or more temperatures where heat may be generated.

As used herein, a temperature sensing tape or similar term can refer to a structure having one or an array of temperature sensing elements that can be arranged in electrical series with a conductor such that the conductor can be integrated in a flexible tape material, a cloth material, or a woven structure or can be a freestanding conductor, such as wire. In some embodiments, the temperature sensing tape can be used for distributed temperature sensing, such as by affixing the temperature sensing tape to a protected element where a temperature is to be measured. For example, the temperature sensing tape can be affixed to the protected element at least in locations at which any of the temperature sensing elements are present in order to impart thermal contact between the temperature sensing elements and the protected element.

Figure 1:
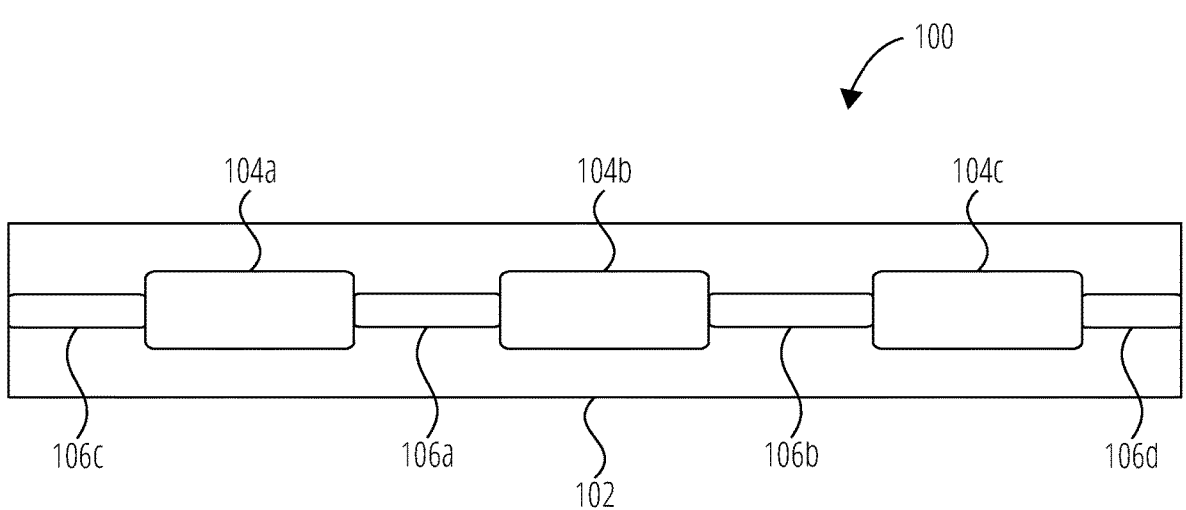
FIG. 1 is a top view illustrating a temperature sensing tape in accordance with disclosed embodiments.

FIG. 1 is a top view illustrating a temperature sensing tape 100 in accordance with disclosed embodiments. As seen, the temperature sensing tape 100 can include an insulating support structure 102, for example, a flexible substrate. In some embodiments, the insulating support structure 102 can include a strip of a dielectric material that can include an adhesive material on one or both sides thereof for adhering the temperature sensing tape 100 to one or a plurality of surfaces of one or a plurality of protected elements. For example, in some embodiments, the insulating support structure 102 can include Scotch tape, polyvinyl chloride (PVC) tape, mylar, and the like. Additionally or alternatively, in some embodiments, the insulating support structure 102 can include a cloth or woven material. In any embodiment, the insulating support structure 102 can be sufficiently flexible to be applied to any surface or surfaces as would be desired by one of ordinary skill in the art, including multiple surfaces extending at angles to one another, curved surfaces, and the like. In some embodiments, the adhesive material can be applied to a bottom side of the insulating support structure 102.

In some embodiments, the temperature sensing tape 100 can also include a plurality of temperature sensing elements 104a, 104b, 104c disposed on the insulating support structure 102 and spaced apart from one another along a length of the insulating support structure 102. In some embodiments, the temperature sensing elements 104a, 104b, 104c can include PPTC sensors or devices and/or PTI sensors or devices.

Although the temperature sensing tape 100 is shown as including three temperature sensing elements 104a, 104b, 104c in FIG. 1, it is to be understood that embodiments disclosed herein are not so limited. Instead, the temperature sensing tape 100 can include more or less than three temperature sensing elements 104a, 104b, 104c and any number as would be desired by one of ordinary skill in the art. For example, in some embodiments, the temperature sensing elements 104a, 104b, 104c can include one long, continuous element. In some embodiments, the number of the temperature sensing elements 104a, 104b, 104c can be dictated by a length of the temperature sensing tape 100, and in some embodiments, the number of the temperature sensing elements 104a, 104b, 104c can be dictated by distances between the temperature sensing elements 104a, 104b, 104c. In this regard, although the temperature sensing elements 104a, 104b, 104c are shown as being evenly spaced from one another in FIG. 1, it is to be understood that embodiments disclosed herein are not so limited. Instead, the temperature sensing elements 104a, 104b, 104c can be disposed at regular or irregular intervals along the length of the insulating support structure 102 as may be dictated or required by a particular application of the temperature sensing tape 100.

In accordance with disclosed embodiments, the temperature sensing elements 104a, 104b, 104c can be formed from a single polymer mixture that can include two or more polymers such that each of the two or more polymers can have a respective, different crystallinity point, thereby causing multiple temperature responses with the single polymer mixture. For example, a polymer matrix material that can include the two or more polymers can be dissolved in a solvent to form the single polymer mixture. Then, a conductive filler can be added to the single polymer mixture to form a copolymer ink, and the copolymer ink can be applied to the insulating support structure 102 where placement of the temperature sensing elements 104a, 104b, 104c is desired. For example, in some embodiments, the copolymer ink can be applied to the insulating support structure 102 via ink jetting pad printing, screen printing, spin coating, and the like. In any embodiment, once the copolymer ink is applied to the insulating support structure 102, the copolymer ink can be heated, for example, to a temperature between 100° C. and 200° C., to evaporate the solvent and form the temperature sensing elements 104a, 104b, 104c. Finally, once the copolymer ink is dried, the copolymer ink can be crosslinked, for example, by exposing the copolymer ink to a radiation beam.

As explained above, the two or more polymers can have different crystallinity points. As such, when a temperature of any of the temperature sensing elements 104a, 104b, 104c reaches a first threshold temperature level, that is, a first turn on point, a resistance of one or more of the temperature sensing elements 104a, 104b, 104c can sharply increase to a first resistance level as a first of the two or more polymers exhibits a first crystallization behavior. Similarly, when the temperature of any of the temperature sensing elements 104a, 104b, 104c reaches a second threshold temperature level, that is, a second turn on point, the resistance of one or more of the temperature sensing elements 104a, 104b, 104c can sharply increase to a second resistance level as a second of the two or more polymers exhibits a second crystallization behavior.

As also explained above, the adhesive material can be applied to, for example, a bottom side of the insulating support structure 102. In some embodiments, the adhesive material can be applied to the bottom side of the insulating support structure 102 only in portions or locations of the insulating support structure 102 that correspond to the temperature sensing elements 104a, 104b, 104c on a top side thereof. That is, the adhesive material can be applied under the temperature sensing elements 104a, 104b, 104c on opposing sides of the insulating support structure 102, thereby improving thermal contact with the surfaces adhered thereto. Additionally or alternatively, in some embodiments, the adhesive can include one or more additives that have high thermal conductivity, such as high thermal conductivity powder, to further improve the thermal contact with the surfaces adhered thereto. For example, additives that have high thermal conductivity can include intrinsic (low electrical conductivity) ZnO, Al$_2$O$_3$, or AN diamond paste and high thermal conductivity electrically conductive particles, including ceramic, metal, or carbon-based particles, fibers, and the like.

In some embodiments, the temperature sensing tape 100 can also include a plurality of flexible conductors 106a, 106*b*, 106*c*, 106*d* disposed on or in the insulating support structure 102. However, in embodiments in which the temperature sensing elements 104*a*, 104*b*, 104*c* includes one long, continuous element, the temperature sensing tape 100 need not include the flexible conductors 106*a*, 106*b*, 106*c*, 106*d*.

In embodiments that include the flexible conductors 106*a*, 106*b*, 106*c*, 106*d*, the flexible conductors 106*a*, 106*b*, 106*c*, 106*d* can form an electrical conductor and be arranged in electrical series with the plurality of temperature sensing elements 104*a*, 104*b*, 104*c* to form a conductive circuit. In particular, the plurality of flexible conductors 106*a*, 106*b*, 106*c*, 106*d* can extend between and be electrically connected to the plurality of temperature sensing elements 104*a*, 104*b*, 104*c*. In some embodiments, the flexible conductors 106*a*, 106*b*, 106*c*, 106*d* can include elongated segments of flexible, electrically conductive material that can be adhered to, printed on, integrated with, or otherwise applied to the insulating support structure 102. For example, in some embodiments, the flexible conductors 106*a*, 106*b*, 106*c*, 106*d* can include copper mesh, silver epoxy, conductive ink, metal wire or ribbon, and the like. As such, in some embodiments, the flexible conductors 106*a*, 106*b*, 106*c*, 106*d* can be shaped as a flat foil, a wire with a round cross-section, a single strand wire, a multistrand wire, a flat wire, a rod, and the like. Although the temperature sensing tape 100 is shown as including four flexible conductors 106*a*, 106*b*, 106*c*, 106*d* in FIG. 1, it is to be understood that embodiments disclosed herein are not so limited. Instead, the temperature sensing tape 100 can include more or less than four flexible conductors 106*a*, 106*b*, 106*c*, 106*d* and any number as would be desired by one of ordinary skill in the art.

Figure 2:
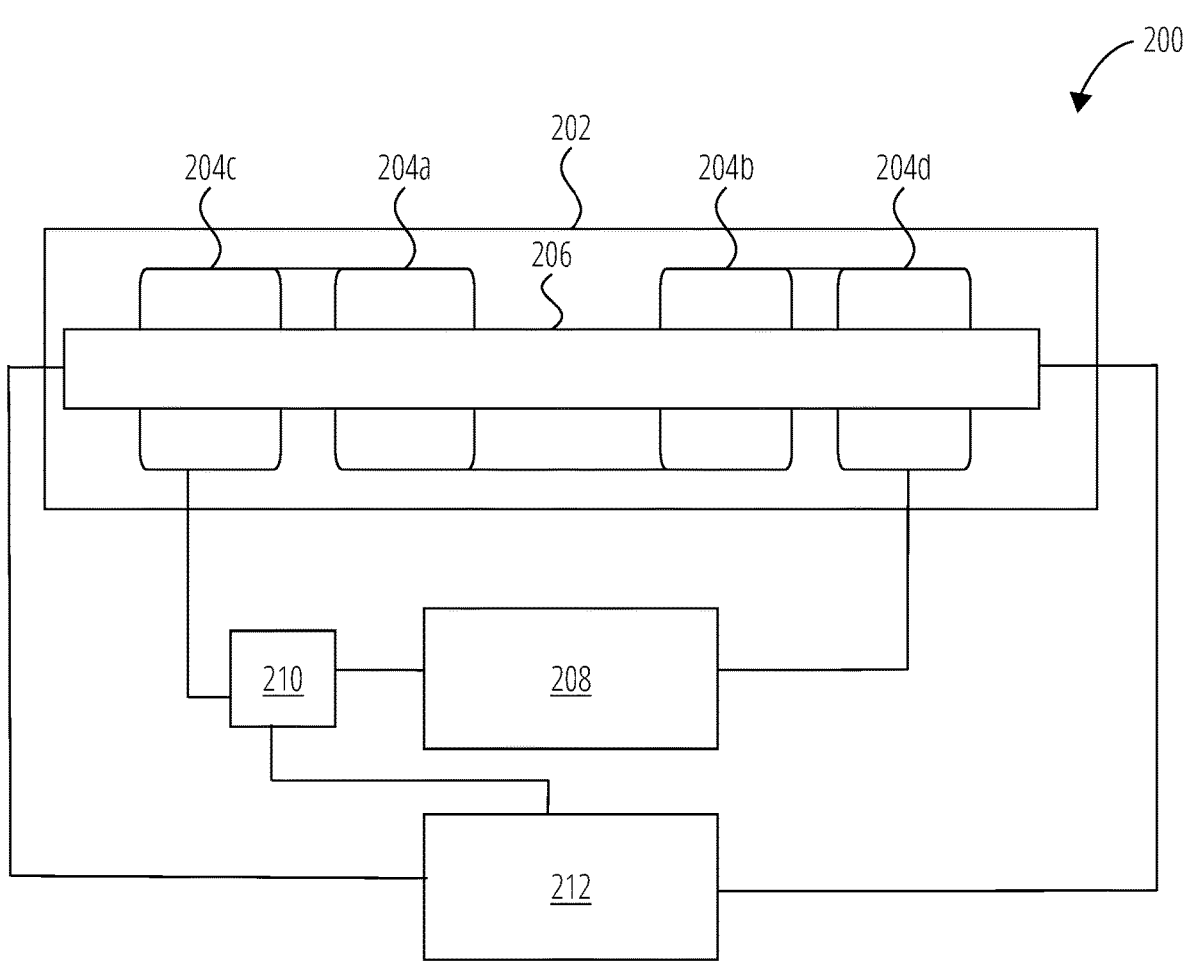
FIG. 2 is a block diagram illustrating a thermal protection system in accordance with disclosed embodiments.

FIG. 2 is a block diagram illustrating a thermal protection system 200 in accordance with disclosed embodiments. As seen, the thermal protection system 200 can include a protected element 202 that can be connected to a load 208 for supplying electrical power thereto. In the embodiment illustrated in FIG. 2, the protected element 202 can include or be a battery, which can include a plurality of cells 204*a*, 204*b*, 204*c*, 204*d* that can be electrically connected in series. For example, the protected element 202 can include or be a lithium-ion battery, a lithium polymer battery, a Ni-MH rechargeable battery, and the like. However, embodiments disclosed herein are not so limited and can include any protected element as would be understood by one of ordinary skill in the art, including any electrical power source or electrical device that would benefit from protection against high temperatures. For example, in some embodiments, the protected element 202 can include or be a printed circuit board, a transformer, a heatsink, a magnetic device, a grid filter, an electromagnetic interference filter, a power tool, a power tool with a battery pack, an electric vehicle, an e-scooter, a laptop computer, a notebook computer, a large battery system, and the like. As a further example, in some embodiments, the protected element 202 can include or be a semiconductor or a semiconductor chip.

In some embodiments, the thermal protection system 200 can also include a temperature sensing tape 206. It is to be understood that the temperature sensing tape 206 in FIG. 2 can be equivalent or substantially similar to the temperature sensing tape 100 of FIG. 1. In this regard, the temperature sensing tape 206 can be thermally coupled to the protected element 202, for example, by adhering the temperature sensing tape 206 to or embedding the temperature sensing tape 206 on the protected element 202, with any temperature sensing elements of the temperature sensing tape 206 being aligned with areas requiring temperature sensing. For example, the temperature sensing elements of the temperature sensing tape 206 can be disposed on, over, or above surfaces of the plurality of cells 204*a*, 204*b*, 204*c*, 204*d* of the protected element 202. In particular, each of the temperature sensing elements of the temperature sensing tape 206 can be positioned so as to be under a respective thermal influence of a respective one of the plurality of cells 204*a*, 204*b*, 204*c*, 204*d* such that an increase in a temperature of one of the plurality of cells 204*a*, 204*b*, 204*c*, 204*d* may cause an increase in a temperature of an associated one of the temperature sensing elements disposed thereon.

In some embodiments, the thermal protection system 200 can also include a control element 212 that can be electrically connected to the temperature sensing tape 206, for example, to any flexible conductors or temperature sensing elements of the temperature sensing tape 206, and configured to monitor a resistance of the temperature sensing tape 206. In some embodiments, the control element 212 can be operatively connected to a disconnect switch 210 that can be connected in electrical series between the protected element 202 and the load 208. For example, in some embodiments, the control element 212 can include a digital control element, such as an ASIC, a microprocessor, and the like, and in some embodiments, the disconnect switch 210 can include a FET, a relay, and the like.

During normal operation of the thermal protection system 200, the protected element 202 can supply electrical power to the load 208, and the temperature in the plurality of cells 204*a*, 204*b*, 204*c*, 204*d* can be within a normal operating range, for example, less than 60° C., less than 80° C., and the like. However, upon an occurrence of a high temperature condition, the temperature of any of the plurality of cells 204*a*, 204*b*, 204*c*, 204*d* can increase above the normal operating range, which may cause the temperature of associated ones of the temperature sensing elements of the temperature sensing tape 206 to increase. In some embodiments, the high temperature condition can be caused by exposure to an external heat source, for example, the protected element 202 sitting out in the sun, or from an overcurrent condition caused by an internal fault in the protected element 202, such as a short circuit.

If the temperature of one or more of the temperature sensing elements of the temperature sensing tape 206 increases above a first threshold temperature level, that is, a first turn on point, the resistance of the temperature sensing tape 206 can increase sharply to a first resistance level. Similarly, if the temperature of one or more of the temperature sensing elements of the temperature sensing tape 206 increases above a second threshold temperature level, that is, a second turn on point, the resistance of the temperature sensing tape 206 can increase sharply to a second resistance level. Thus, a response of the temperature sensing tape 206 can be near instantaneous (e.g., sharp increases), which can be beneficial in dynamic situations, such as short circuits.

Figure 3:
FIG. 3 is a graph illustrating turn on points of temperature sensing elements in accordance with disclosed embodiments.
Figure 3:
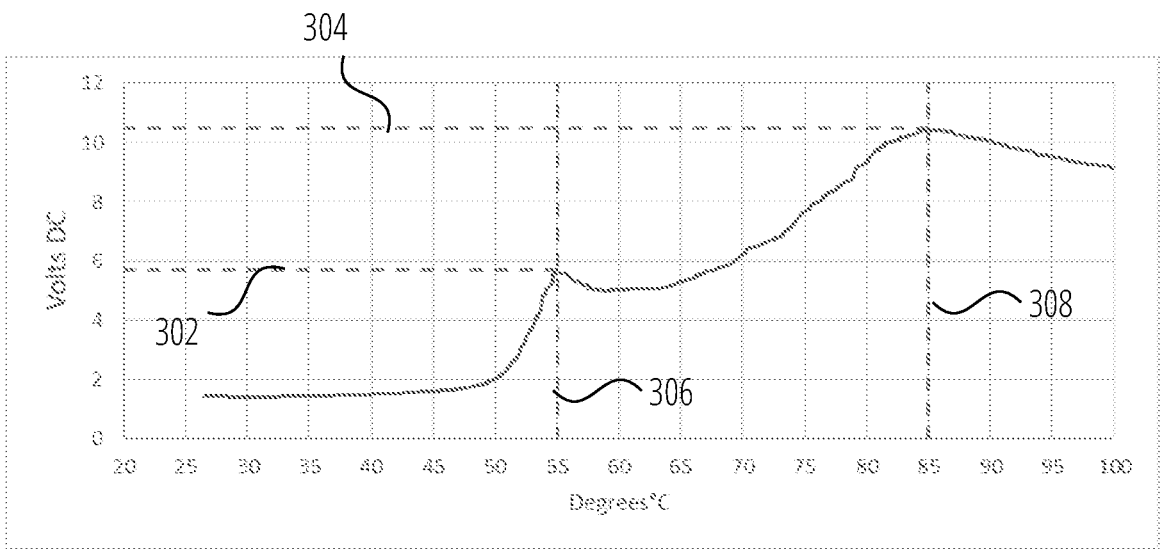

FIG. 3 is a graph 300 illustrating turn on points of temperature sensing elements in accordance with disclosed embodiments. As explained above, the control element 212 can be configured to monitor the resistance of the temperature sensing tape 206. As such, the control element 212 can be configured to monitor a voltage change in the temperature sensing tape 206 and control operation of the thermal protection system 200 accordingly.

For example, when the control element 212 measures a voltage in the temperature sensing tape 206 to be below a first voltage level 302, indicating that the temperature of the temperature sensing elements of the temperature sensing tape 206 is below the first threshold temperature level 306, the control element 212 can determine that the temperature of the protected element 202 is within the normal operating range. However, when the control element 212 measures the voltage in the temperature sensing tape 206 to be at or above the first voltage level 302, but below a second voltage level 304, indicating that the temperature of at least one of the temperature sensing elements of the temperature sensing tape 206 is at or above the first threshold temperature level 306, but below second threshold temperature level 308, the control element 212 can determine that the temperature of the protected element 202 has exceeded the normal operating range, but is at a warning level. Similarly, when the control element 212 measures the voltage in the temperature sensing tape 206 to be at or above the second voltage level 304, indicating that the temperature of at least one of the temperature sensing elements of the temperature sensing tape 206 is at or above the second threshold temperature level 308, the control element 212 can determine that the temperature of the protected element 202 has exceeded the normal operating range and is at an alarm level or a shut off level.

In some embodiments, responsive to the control element 212 determining that the temperature of the protected element 202 is at the warning level, the control element 212 can cause a warning signal to be transmitted. Similarly, in some embodiments, responsive to the control element 212 determining that the temperature of the protected element 202 is at the alarm level or the shut off level, the control element 212 can cause an alarm signal to be transmitted. Additionally or alternatively, in some embodiments, responsive to the control element 212 determining that the temperature of at the protected element 202 is at the alarm level or the shut off level, the control element 212 can open the disconnect switch 210, thereby arresting or preventing current flow in the thermal protection system 200 and preventing or mitigating damage that could otherwise result if such a high temperature or high current condition were allowed to persist. Additionally or alternatively, in some embodiments, responsive to the control element 212 determining that the temperature in the protected element 202 is at the alarm level or the shut off level, the control element 212 can initiate a shut down sequence to stop the current flow in the protected element 202, for example, by arresting or preventing the current flow in a gate driver associated with the protected element 202, thereby preventing or mitigating damage that could otherwise result if such a high temperature or high current condition were allowed to persist.

FIG. 4 is a flow diagram illustrating a method 400 in accordance with disclosed embodiments. As seen, the method 400 can include providing a polymer matrix material that include can include two or more polymers as in 402, wherein each of the two or more polymers can have a respective, different crystallinity point. Then, the method 400 can include dissolving the polymer matrix material in a solvent to form a single polymer mixture as in 404, adding a conductive filler to the single polymer mixture to form a copolymer ink as in 406, and applying the copolymer ink to an insulating support structure where placement of a temperature sensing element is desired as in 408. In some embodiments, the method 400 can also include heating the copolymer ink to evaporate the solvent, thereby forming the temperature sensing element. Additionally or alternatively, in some embodiments, the method 400 can include exposing the copolymer ink to radiation to crosslink the copolymer ink.

Next, the method 400 can include thermally coupling the insulating support structure to a protected element as in 410. When an increase in a temperature of the protected element causes a temperature of the copolymer ink to reach a first threshold temperature, the method 400 can include identifying an increase of a resistance of the copolymer ink to a first resistance level as a first of the two or more polymers exhibits a first crystallization behavior as in 412. Similarly, when the increase in the temperature of the protected element causes the temperature of the copolymer ink to reach a second threshold temperature, the method 400 can include identifying the increase of the resistance of the copolymer ink to a second resistance level as a second of the two or more polymers exhibits a second crystallization behavior as in 414.

When the resistance of the copolymer ink increases to the first resistance level, the method 400 can include measuring a voltage of the copolymer ink to be at or above a first voltage level, but below a second voltage level as in 416. In some embodiments, responsive to measuring the voltage of the copolymer ink being at or above the first voltage level, but below the second voltage level, the method can include causing a warning signal to be issued. However, when the resistance of the copolymer ink increases to the second resistance level, the method 400 can include measuring the voltage of the temperature sensing tape to be at or above the second voltage level as in 418. In some embodiments, responsive to measuring the voltage of the copolymer ink being at or above the second voltage level, the method 400 can include causing an alarm signal to be issued, causing a disconnect switch to be opened, or initiating a shut down sequence to stop current flow in the protected element.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations, and changes to the described embodiments are possible without departing from the sphere and scope of the present disclosure, as defined in the appended claims. Accordingly, it is intended that the present disclosure not be limited to the described embodiments, but that it has the full scope defined by the language of the following claims and equivalents thereof.

What is claimed is:

1. A temperature sensing tape comprising:
an insulating support structure; and
at least one temperature sensing element disposed on the insulating support structure, wherein the at least one temperature sensing element comprises a single continuous sensing element formed from a single polymer mixture that includes two or more polymers, wherein the single polymer mixture is formed by dissolving and intermixing the two or more polymers into a homogeneous polymer matrix in which the two or more polymers are distributed within the same sensing element, and wherein each of the two or more polymers has a respective, different crystallinity point, and wherein the at least one temperature sensing element is configured to exhibit multiple discrete increases in electrical resistance within the same sensing element at respective threshold temperatures corresponding to crystallization of the respective polymers.

2. The temperature sensing tape of claim 1 wherein, when a temperature of the at least one temperature sensing element reaches a first threshold temperature, a resistance of the at least one temperature sensing element increases to a first resistance level as a first of the two or more polymers exhibits a first crystallization behavior, and wherein, when the temperature of the at least one temperature sensing element reaches a second threshold temperature, the resistance of the at least one temperature sensing element increases to a second resistance level as a second of the two or more polymers exhibits a second crystallization behavior.

3. The temperature sensing tape of claim 1 further comprising:

an adhesive material, wherein the at least one temperature sensing element is disposed on a first side of the insulating support structure, and wherein the adhesive material is disposed on a second side of the insulating support structure.

4. The temperature sensing tape of claim 1 wherein the at least one temperature sensing element includes a polymeric positive temperature coefficient (PPTC) sensor or a printed temperature indicator (PTI) sensor.

5. The temperature sensing tape of claim 1 further comprising:

at least one flexible conductor disposed on the insulating support structure and arranged in series with the at least one temperature sensing element to form a conductive circuit.

6. A thermal protection system comprising:

a protected element; and a temperature sensing tape thermally coupled to the protected element, wherein the temperature sensing tape includes an insulating support structure and at least one temperature sensing element disposed on the insulating support structure, wherein the at least one temperature sensing element is a single continuous sensing element formed from a single polymer mixture that includes two or more polymers, the single polymer mixture being formed by dissolving and intermixing the two or more polymers into a homogeneous polymer matrix forming the sensing element, and wherein each of the two or more polymers has a respective, different crystallinity point such that the sensing element exhibits multiple resistance transitions corresponding to crystallization of the respective polymers.

7. The thermal protection system of claim 6 wherein, when an increase in a temperature of the protected element causes a temperature of the at least one temperature sensing element to reach a first threshold temperature, a resistance of the at least one temperature sensing element increases to a first resistance level as a first of the two or more polymers exhibits a first crystallization behavior, and wherein, when the increase in the temperature of the protected element causes the temperature of the at least one temperature sensing element to reach a second threshold temperature, the resistance of the at least one temperature sensing element increases to a second resistance level as a second of the two or more polymers exhibits a second crystallization behavior.

8. The thermal protection system of claim 7 further comprising:

a control element electrically connected to the temperature sensing tape.

9. The thermal protection system of claim 8 wherein, when the resistance of the at least one temperature sensing element increases to the first resistance level, the control element measures a voltage of the temperature sensing tape to be at or above a first voltage level, but below a second voltage level, and wherein, when the resistance of the at least one temperature sensing element increases to the second resistance level, the control element measures the voltage of the temperature sensing tape to be at or above the second voltage level.

10. The thermal protection system of claim 9 wherein, responsive to the control element measuring the voltage of the temperature sensing tape to be at or above the first voltage level, but below the second voltage level, the control element causes a warning signal to be issued.

11. The thermal protection system of claim 9 wherein, responsive to the control element measuring the voltage of the temperature sensing tape to be at or above the second voltage level, the control element causes an alarm signal to be issued.

12. The thermal protection system of claim 9 wherein, responsive to the control element measuring the voltage of the temperature sensing tape to be at or above the second voltage level, the control element initiates a shut down sequence to stop current flow in the protected element.

13. The thermal protection system of claim 9 further comprising:

a load; and a disconnect switch, wherein the protected element provides power to the load, wherein the control element is operatively connected to the disconnect switch, wherein the disconnect switch is connected in series between the protected element and the load, and wherein, responsive to the control element measuring the voltage of the temperature sensing tape to be at or above the second voltage level, the control element causes the disconnect switch to be opened.

14. A method comprising:

providing a polymer matrix material that includes two or more polymers, each of the two or more polymers having a respective, different crystallinity point;

dissolving the polymer matrix material in a solvent to form a single polymer mixture in which the two or more polymers are intermixed to form a homogeneous polymer matrix;

adding a conductive filler to the single polymer mixture to form a copolymer ink; and applying the copolymer ink to an insulating support structure where placement of a single continuous temperature sensing element is desired, wherein the temperature sensing element formed by the applied copolymer ink is configured to exhibit multiple discrete increases in electrical resistance within the same sensing element at respective threshold temperatures corresponding to crystallization of the respective polymer.

15. The method of claim 14 further comprising: heating the copolymer ink to evaporate the solvent.

16. The method of claim 14 further comprising:

exposing the copolymer ink to radiation to crosslink the copolymer ink.

17. The method of claim 14 further comprising:

thermally coupling the insulating support structure to a protected element;

when an increase in a temperature of the protected element causes a temperature of the copolymer ink to reach a first threshold temperature, identifying an increase of a resistance of the copolymer ink to a first resistance level as a first of the two or more polymers exhibits a first crystallization behavior; and when the increase in the temperature of the protected element causes the temperature of the copolymer ink to reach a second threshold temperature, identifying the increase of the resistance of the copolymer ink to a second resistance level as a second of the two or more polymers exhibits a second crystallization behavior.

18. The method of claim 17 further comprising:

when the resistance of the copolymer ink increases to the first resistance level, measuring a voltage of the copolymer ink to be at or above a first voltage level, but below a second voltage level; and when the resistance of the copolymer ink increases to the second resistance level, measuring the voltage of the temperature sensing tape to be at or above the second voltage level.

19. The method of claim 18 further comprising:

responsive to measuring the voltage of the copolymer ink being at or above the first voltage level, but below the second voltage level, causing a warning signal to be issued.

20. The method of claim 18 further comprising:

responsive to measuring the voltage of the copolymer ink being at or above the second voltage level, causing an alarm signal to be issued, causing a disconnect switch to be opened, or initiating a shut down sequence to stop current flow in the protected element.

* * * * *